US011455574B2

(12) United States Patent
Arra et al.

(10) Patent No.: US 11,455,574 B2
(45) Date of Patent: Sep. 27, 2022

(54) DYNAMICALLY PREDICT OPTIMAL PARALLEL APPLY ALGORITHMS

(71) Applicant: International Business Machines Corporation, Armonk, NY (US)

(72) Inventors: Venkat R. Arra, Bengaluru (IN); Paul M. Cadarette, Hernet, CA (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/690,158

(22) Filed: Nov. 21, 2019

(65) Prior Publication Data

US 2021/0158201 A1 May 27, 2021

(51) Int. Cl.
*G06F 16/00* (2019.01)
*G06N 20/00* (2019.01)
*G06F 16/27* (2019.01)

(52) U.S. Cl.
CPC ............. *G06N 20/00* (2019.01); *G06F 16/27* (2019.01)

(58) Field of Classification Search
CPC .. G06N 20/00; G06N 20/27; G06N 20/24532; G06F 16/27; G06F 16/24532
See application file for complete search history.

(56) References Cited

U.S. PATENT DOCUMENTS

| | | | |
|---|---|---|---|
| 8,539,094 B1 * | 9/2013 | Marr | H04L 47/125 709/235 |
| 9,317,215 B2 | 4/2016 | Chen et al. | |
| 9,514,180 B1 * | 12/2016 | Cadarette | G06F 16/2358 |
| 10,140,097 B2 | 11/2018 | Mauerer | |
| 2017/0147292 A1 | 5/2017 | Mauerer | |
| 2017/0177691 A1 | 6/2017 | Cadarette et al. | |
| 2019/0121566 A1 * | 4/2019 | Gold | G06N 3/063 |
| 2019/0146966 A1 | 5/2019 | Morfonios et al. | |
| 2020/0050966 A1 * | 2/2020 | Enuka | G06K 9/6267 |
| 2020/0193322 A1 * | 6/2020 | Korada | G06F 16/958 |
| 2020/0258031 A1 * | 8/2020 | Makhija | G06N 5/02 |

OTHER PUBLICATIONS

Herodotos Herodotou and Elena Kakoulli, Automating distributed tiered storage management in cluster computing. Proc. VLDB Endow. 13, 1, 43-56, Sep. 2019.*

(Continued)

*Primary Examiner* — Greta L Robinson
(74) *Attorney, Agent, or Firm* — Peter J. Edwards

(57) ABSTRACT

A method, system, and computer program product to analyze data patterns in source workloads and predict the optimal parallel apply algorithms, where the method may include receiving source workload data and replication environment data, where the source workload data includes at least a stream of changes to a target DBMS. The method may also include analyzing characteristics of the source workload data and the replication environment data. The method may also include inputting, as input variables, the characteristics of the source workload data and the replication environment data into a machine learning algorithm. The method may also include obtaining, from the machine learning algorithm, an optimal parallel apply algorithm from a plurality of parallel apply algorithms. The method may also include applying the optimal parallel apply algorithm to the target database management system.

20 Claims, 6 Drawing Sheets

(56) References Cited

OTHER PUBLICATIONS

Axel Busch et al., Automated Workload Characterization for I/O Performance Analysis in Virtualized Environments. In Proceedings of the 6th ACM/SPEC International Conference on Performance Engineering. Association for Computing Machinery, 265-276, Jan. 2015.*

Mell et al., "The NIST Definition of Cloud Computing," Recommendations of the National Institute of Standards and Technology, U.S. Department of Commerce, Special Publication 800-145, Sep. 2011, 7 pages.

* cited by examiner

DYNAMICALLY PREDICT OPTIMAL PARALLEL APPLY ALGORITHMS

BACKGROUND

The present disclosure relates to parallel computing, database replication, and software replication deployment, and more specifically to analyzing data in source workloads and predicting optimal parallel apply algorithms.

The process of copying data from a first (e.g., source) database to one or more other (e.g., target) databases is referred to as replication. The databases may be at the same or different sites/locations and may be on the same or different networks. Changes or updates that are made in the source database may be copied, or replicated, to any other target databases. Similarly, changes made in a target database may be copied to the source database, and the source database may replicate the change to the other target databases. This way, each database may have identical, or almost identical, copies of data.

SUMMARY

The present disclosure provides a computer-implemented method, system, and computer program product to analyze data and/or data patterns in source workloads and predict the optimal parallel apply algorithms. According to an embodiment of the present invention, the method may include receiving source workload data and replication environment data, where the source workload data includes at least a stream of changes to a target database management system. The method may also include analyzing characteristics of the source workload data and the replication environment data. The method may also include inputting, as input variables, the characteristics of the source workload data and the replication environment data into a machine learning algorithm. The method may also include obtaining, from the machine learning algorithm, an optimal parallel apply algorithm from a plurality of parallel apply algorithms. The method may also include applying the optimal parallel apply algorithm to the target database management system. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
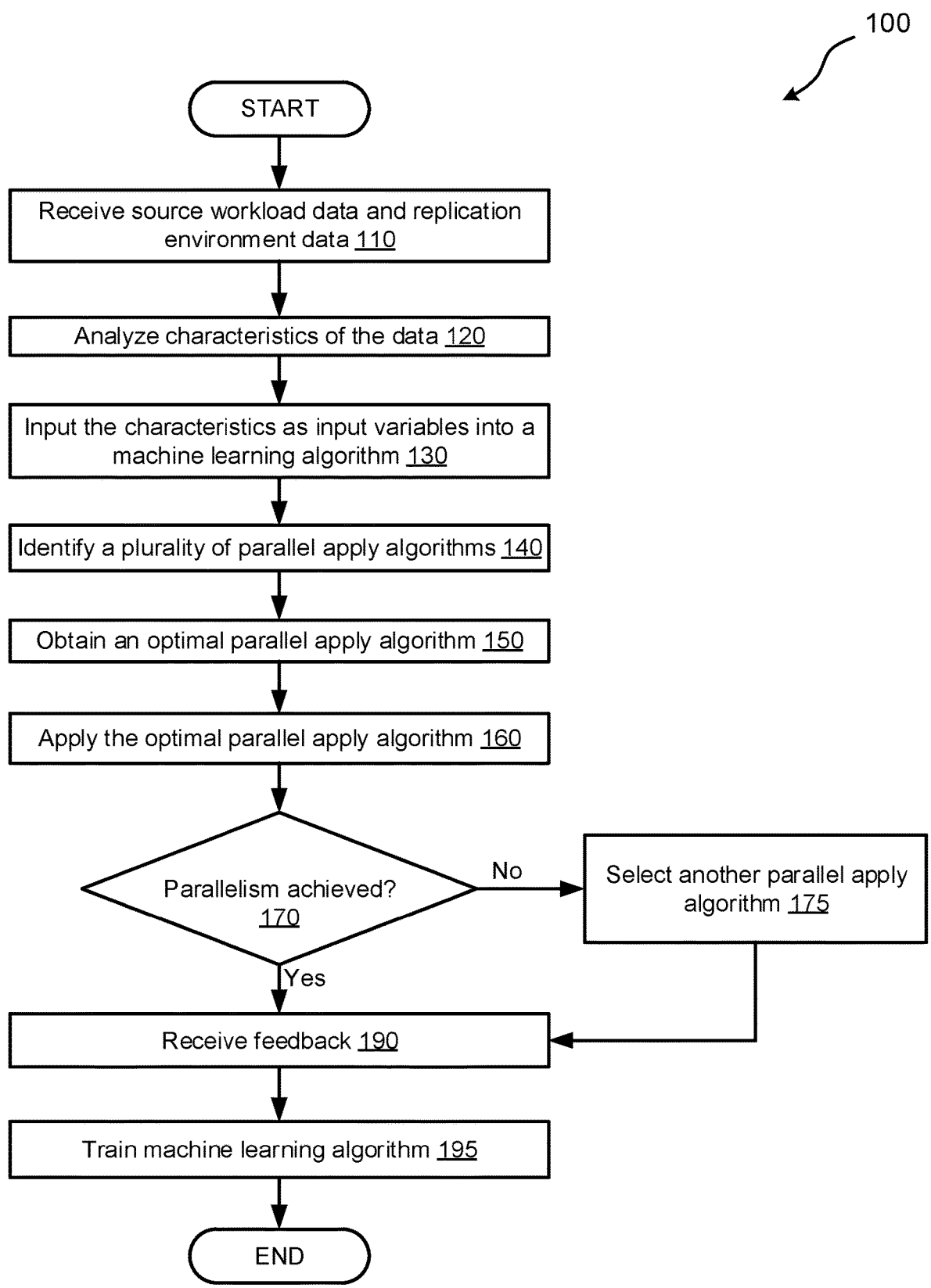
FIG. 1 depicts a flowchart of a set of operations for predicting an appropriate parallel apply algorithm, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to database replication and software replication deployment, and more specifically to analyzing data and/or data patterns in source workloads and predicting the optimal parallel apply algorithms. While the present disclosure is not necessarily limited to such applications, various aspects of the disclosure may be appreciated through a discussion of various examples using this context.

Parallel computing may execute many processes simultaneously across multiple processors. In various systems, particularly complex systems, parallel computing along with data sharing may be utilized to allow for a plurality of processors to share workloads, which may result in high performance and availability for the system. Software replication may be used to share data and applications between processors, in order for the workloads to be executed/shared across the multiple processors. For example, sometimes applications may be replicated from a source database management system (DBMS) to a target DBMS and processed using both DBMSs. This may allow the application to benefit from the both the processing resources of the source DBMS and target DBMS. However, in order to achieve that benefit, the application must first be configured in the source DBMS for parallel processing.

In conventional software replication deployment with at least a source DBMS and a target DBMS, a bottleneck may occur when data is applied to, or replicated to, the target DBMS. This is because, even though data changes may be transmitted or copied from a single merged log into a single pipe, source applications are typically deployed in parallel fashions across multiple source nodes in a cluster configuration. As discussed herein, deploying a source application in a parallel fashion on a source DBMS is described as creating a parallel environment on the source DBMS.

Applications are typically deployed in a parallel fashion (for example, copied and executed across multiple processors) due to a need for parallel processing. Parallel processing may divide and run program tasks on multiple processors, or microprocessors. In software replication, data and applications may be replicated and may be run on various processors and DBMSs. The data and/or applications may be replicated from a source DBMS (i.e., the DBMS with the original data and/or applications) to a target DBMS. When the data and/or applications are copied from the source DBMS, the source likely will still need to use said data and run said applications. Therefore, the applications run on the source DBMS (source applications) are typically deployed using parallel processing so that the applications may be run on multiple processors and multiple DBMSs.

When source data (or a change in the source data) is copied to the target DBMS, a replication target engine may need to employ numerous parallel-apply techniques (e.g., dependency analysis, hash by key file, dynamic serialization for unkeyed data, etc.) in order to simulate the source DBMS's naturally parallel environment. These techniques are conventionally manually configured at the target, but they are highly sensitive to changes in data and/or data patterns in the stream. For instance, what creates the best simulated parallel environment for one type of replicated data or data pattern, might fail (e.g., serialize) for another type of replicated data. For example, when a workload being transmitted to a target relational database management system (RDBMS) includes only one table with mostly inserts occurring on the table, a parallel apply algorithm that parallelizes by table may be effective. But, when the workload being transmitted to the target RDBMS is a multipurpose table and includes inserts, updates, and deletes (i.e., is more complex) a parallel algorithm that parallelizes by hash may be necessary due to the complexity of the workload. Determining an effective parallel apply algorithm for a particular workload may be a lengthy process, and may conventionally be done manually (for instance, by manually determining and selecting a parallel apply algorithm that fits the particular workload). Thus, while transferring the data per se may not be a slow process, replicating the parallel environment into which that data is deployed tends to be.

The present disclosure provides a computer-implemented method, system, and computer program product to analyze data and data patterns in source workloads and predict optimal parallel apply algorithms. As discussed herein, there are numerous parallel apply techniques/algorithms that may be used, and each algorithm may work for some replicated data or data patterns, and may not work for other data patterns. Data patterns may be trends, structures, similarities, features, regularities, etc. in data. As an example of data patterns, daily batch cycles can be dynamically discovered. They may seldom occur at set time windows, due to concurrent batch processing, so a pattern of daily batch cycles may be determined/discovered. Another example of data patterns may be heuristics of online applications. Certain online applications may be run at given times in the day or week and these applications have certain heuristics. For instance, a given application might interleave non-keyed and keyed updates in a given pattern, or key distributions for keyed updates may be affected by application behavior.

To predict an optimal parallel apply algorithm, replicated data and data patterns may be analyzed in an incoming stream of changes (from a source DBMS to a target DBMS), in order to dynamically predict the appropriate parallel apply technique/algorithm. This may result in adaptive parallelism in which the parallel apply algorithm is able to adapt depending on the incoming data and its data patterns. Adaptive parallelism may allow for a continuous, or at least more continuous, simulated parallel environment for the incoming data in the target DBMS. In some embodiments, parallel apply algorithms may be utilized on systems other than DBMS s. For example, parallel apply algorithms may be used for targeting streaming systems (e.g., KAFKA®).

Additionally, machine learning can be used to learn which selected parallel techniques work best for a given input of incoming data (for example, including through getting feedback on processor thread usage, particularly when being executed in parallel (for example, through multithreading, multiprocessing, etc.), and response times for selection and implementation of the parallel apply algorithm), as well as to discover data patterns. Knowing these data patterns may allow a replication target engine (on the target DBMS) to proactively employ parallel apply algorithms to avoid latency bumps from reactive adjusting (i.e., adjusting after an error is discovered). If, as it occurs in conventional data replication, parallel apply algorithms are employed and/or adjusted only when it is determined that there is a problem with a current parallel apply algorithm, there may be a delay, or latency bump, due to a disruption in the simulated parallel environment. Using machine learning to predict/select an appropriate parallel apply algorithm may allow for continuous changing and/or adjusting of the appropriate algorithm depending on the data that is being inputted to the target DBMS.

For instance, a set of replicated data may be preliminarily determined, based on an initial portion of the data stream, to best fit a first parallel apply algorithm. However, as a continuous stream of replicated data is inputted, the replicated data may appear to best fit a second parallel apply algorithm. Utilizing machine learning may allow for this change in the optimal parallel algorithm to be determined as soon as the data is read/analyzed by the target DBMS, which may result in no disruption in the simulated parallel environment. Further, utilizing machine learning may result in a more accurate prediction/determination of an optimal parallel apply algorithm due to the continuous learning and training of the machine learning model.

Without the use of a machine learning algorithm, the parallel apply algorithm may not be adjusted or changed until issues are detected for the first parallel algorithm. When the issues are detected, the algorithm may need to be manually selected and changed. For example, without machine learning, once it is determined that the first parallel apply algorithm would be used, this algorithm may continue to be used until it is detected that the first parallel apply algorithm is not creating a simulated parallel environment. Before this issue is determined, the first parallel apply algorithm may no longer be the best fit algorithm for the data stream, but because it is still creating a parallel environment, or at least it is not yet detected that there was no parallel environment, the first parallel apply algorithm may still be used (even if the second parallel apply algorithm was now a better fit). Once it is detected that the first parallel apply algorithm is not creating the simulated parallel environment, a user (e.g., a developer) may have to manually adjust the parallel apply algorithm.

An algorithm based on machine learning models (i.e., a machine learning algorithm) may be created to dynamically analyze data and data patterns from source workloads to determine an appropriate and efficient parallel apply algorithm that can be used by a near real-time replication target engine to simulate a parallel environment and reduce any difficulties with the dataflow from the source DBMS (due to a lack of parallel environment). If the target DBMS does not have a parallel environment similar to the source DBMS, dataflow to the target DBMS may be affected (for example, reduced) due to the lack of appropriate environment for the data. Even if, without utilizing machine learning capabilities, a parallel apply algorithm achieved a parallel environment, changes to the continuous dataflow from the source DBMS may reduce or eliminate the effectiveness of the parallel apply algorithm. In other words, without machine learning capabilities, the correct algorithm may not be determined, and even if it is, it may not always be effective. Further, once the parallel apply algorithm is not effective, it may not immediately be detected. The machine learning capabilities of the present disclosure may allow for dynamically adjusting to the incoming workloads, which may prevent any lack of parallel environment for the incoming workloads/data. This may also increase scalability and performance of the parallel apply algorithm(s) due to the dynamic adjusting.

Figure 2:
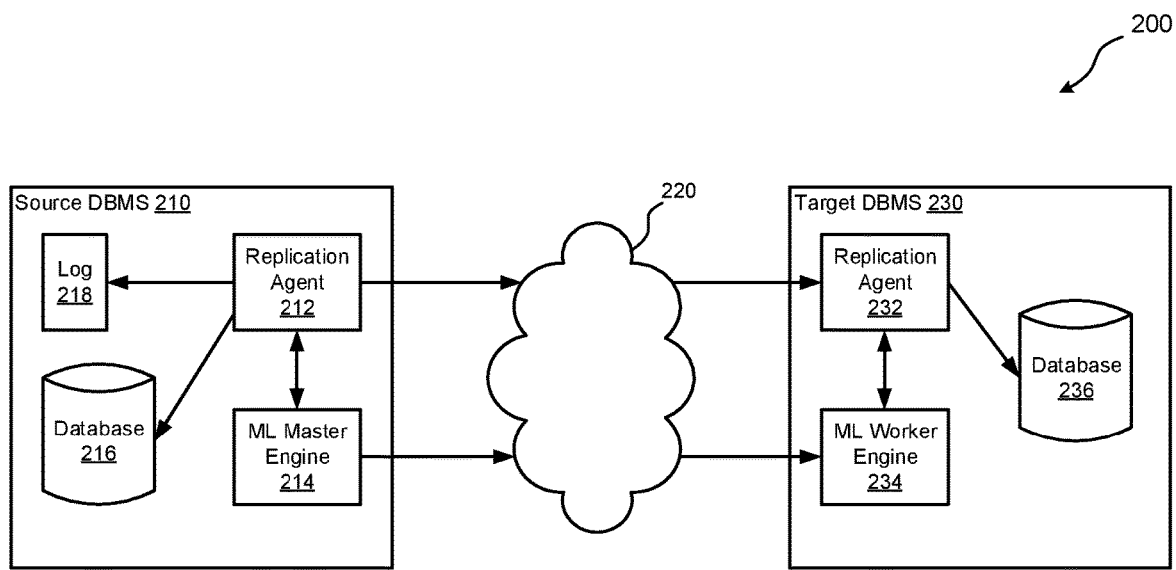
FIG. 2 depicts a schematic diagram of a sample replicated database management system, according to some embodiments.
Figure 4:
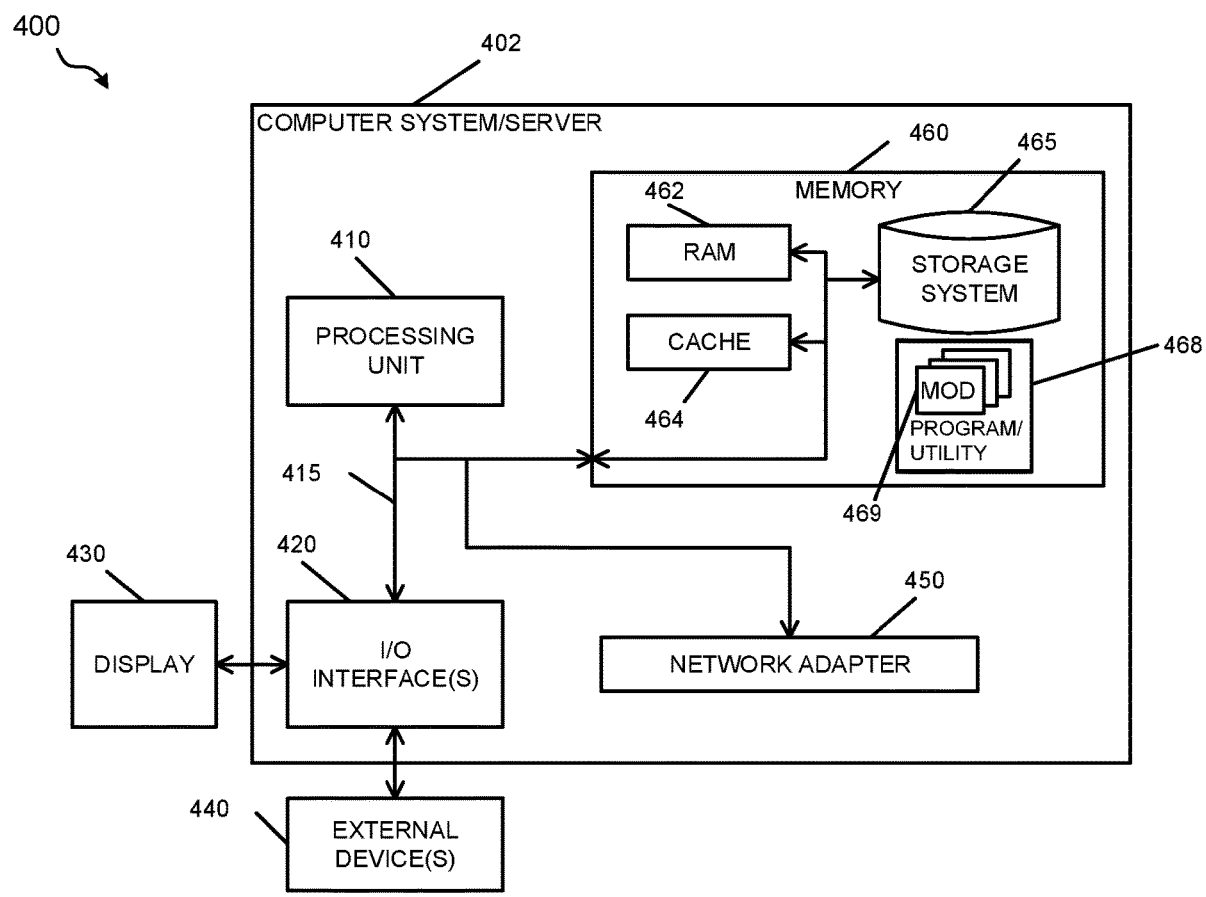
FIG. 4 depicts a block diagram of a sample computer system, according to some embodiments.

Referring now to FIG. 1 a flowchart illustrating a method 100 for predicting an appropriate (e.g., optimal) parallel apply algorithm is depicted, according to some embodiments. In some embodiments, the method 100 is implemented as a computer script or computer program (e.g., computer executable code) to be executed by a server on or connected to a computer system (e.g., computer system 400 (FIG. 4)). In some embodiments, the server is a computer device, such as computer system/server 402 (FIG. 4). In some embodiments, the server is a database management system, such as target database management system 230 (FIG. 2).

Method 100 includes operation 110: receive source workload data and replication environment data. In a database replication environment, a source database management system (DBMS) transmits workload data to a target DBMS. Workload data may be any data relating to workloads being copied, or sent, to the target DBMS. In some embodiments, this data is transmitted because it is being replicated, or copied, to the target DBMS. In some embodiments, the database replication environment utilizes distributed computing and offloads workload data processing, or at least some workload data processing, to other (target) DBMS s. The workload data may be read from a log in the source DBMS and applied (for example, through replaying transactions) to the target DBMS. In some embodiments, the source workload data may include subscription mappings and table mappings information or the source workloads.

In some embodiments, the workload data includes at least a stream of changes to be incorporated into a target DBMS. When changes or updates are made to the source DBMS, these changes may be communicated to the target DBMS due to the database replication relationship. Therefore, the workload data may include changes to the target DBMS.

In some embodiments, replication environment data is also received by the target DBMS. Replication environment data may be data relating to the source DBMS and target DBMS environment (for instance, potential limitations on the functioning of the target DBMS). For example, replication environment data may be system resource capacity and/or target database performance. In some embodiments, the source DBMS may have the workload data and the replication environment data, and may send the data to the target DBMS. For example, the workload data and the replication environment data may be kept in data log(s) (e.g., log 218 (FIG. 2)) on the source DBMS and may be obtained from the log when being sent (e.g., read) to the target DBMS.

Method 100 includes operation 120 to analyze characteristics of the data. Analyzing characteristics of the data may include developing structured data about the workload data and environment. The workload data and replication environment data may each have various characteristics. In some embodiments, the characteristics of the data may be features of the data. For example, workload data characteristics may correspond to features of the workload. Examples of workload data characteristics may include transaction size, table size, row size, key distribution patterns, unique update sequences, and unkeyed data patterns. Similarly, replication environment data characteristics may correspond to features of the replication environment. For example, characteristics of the replication environment may include system resource capacity and/or target database performance. In some embodiments, replication environment data includes database data, and analyzing the characteristics of the data may include analyzing database data characteristics. Examples of database data characteristics may include defined table structure, related objects, data organization (for example, whether data is row or column organized), etc.

In some embodiments, analyzing the characteristics of the data may include analyzing the workload data and the replication environment data and identifying, based on the analyzing, characteristics of the workload data and the replication environment data. For example, if the DBMS is a relational database management system (RDBMS), where the data is organized into tables of columns and rows, the workload data may be organized in certain locations on one or more tables on a source RDBMS. Analyzing the workload data may determine its table size (i.e., the size of the table where the workload data is organized), row size (i.e., the size of the row(s) where the workload data is organized), etc. Further, each row may be identified by a key, and analyzing the workload data may determine key distribution patterns for the table, unkeyed data patterns, etc.

In some embodiments, analyzing the characteristics of the data may include identifying data patterns in the source workload data and the replication environment data. Data patterns may be trends, structures, similarities, features, regularities, etc. in data. As an example of data patterns, daily batch cycles can be dynamically discovered. They may seldom occur at set time windows, due to concurrent batch processing, so a pattern of daily batch cycles may be determined/discovered. Another example of data patterns may be heuristics of online applications, referred to herein as application patterns. Certain online applications may be run at given times in the day or week and these applications have certain heuristics/application patterns. For instance, a given application might interleave non-keyed and keyed updates in a given pattern, or key distributions for keyed updates may be affected by application behavior.

In some embodiments, analyzing the characteristics of the data (i.e., the workload data and the replication environment data) may include leveraging the characteristics of the data against at least one of replication latency and/or throughput statistics. Latency may be the amount of time between when a change was made to data on a source table (i.e., a data table on a source DBMS, or RDBMS) and when the change is applied to a target table (i.e., a data table on a target DBMS, or RDBMS). Throughput may be a rate of which data changes are retrieved, sent and applied on the target DBMS. Leveraging the characteristics of the data against latency/throughput statistics may include determining a relationship, if any, between the characteristics and the latency/throughput statistics. This may help determine any relationship between the data characteristics and an efficiency of data replication (identified by the latency and throughput).

Method 100 includes operation 130 to input the characteristics as input variables into a machine learning algorithm. In some embodiments, as discussed herein, one or more parallel apply algorithms may need to be applied in order to simulate a parallel environment (i.e., achieving parallelism) in the target DBMS. Achieving a parallel environment, either simulated or natural, may be referred to herein as achieving parallelism. The source DBMS may have a naturally parallel environment due to the replication database environment, and the parallel environment may need to be replicated in the target DBMS in order to avoid data bottlenecks when copying data to the target DBMS. Parallel apply algorithms may be sensitive to data changes and may work for one grouping of data but may fail for another grouping of data, or even just a simple change in the first group of data. For example, when a workload being transmitted to a target relational database management system (RDBMS) includes only one table with mostly inserts occurring on the table, a parallel apply algorithm that parallelizes by table may be effective. But, when the workload being transmitted to the target RDBMS is a multi-purpose table and includes inserts, updates, and deletes (i.e., is more complex) a parallel algorithm that parallelizes by hash may be necessary due to the complexity of the workload. A machine learning algorithm may be used in order to avoid bottlenecks and failures due to using an incorrect parallel apply algorithm. The characteristics of the source workload data and the replication environment data may be input variables of the machine learning algorithm. Because machine learning allows for constant training and learning, the algorithm may continually improve its accuracy. Further, the data characteristics may be continuously inputted, or at least inputted any time a change occurs, which may allow the machine learning algorithm to adjust its output (an optimal parallel apply algorithm) based on the new/updated inputs.

In some embodiments, inputting the characteristics as input variables further includes inputting the data patterns as input variables. In some embodiments, for example, a machine learning algorithm may help dynamically discover data patterns in the data, which may help the parallel apply algorithm(s) be proactively employed instead of reactively employed. Inputting identified data patterns as input variables may help the machine learning algorithm to learn the data patterns and potentially to identify data patterns in the future. In some instances, the actual data that is being inputted may be different, but may have identical, or at least similar, data patterns. Identifying the data patterns in the data and utilizing machine learning to assist in future identifying may help accurately, and possibly proactively, identify the correct parallel apply algorithm due to the consideration of the data patterns instead of just the data itself.

In some embodiments, the machine learning algorithm is a logistic regression algorithm. If a source DBMS has changing workloads, the machine learning may have to continuously and dynamically be running, in order to identify and account for those changes in workloads. A logistic regression algorithm may allow for the changing workloads, and therefore changing input values, to be continuously inputted and updated based on the changes.

Method 100 includes operation 140 to identify a plurality of parallel apply algorithms. In some embodiments, the parallel apply algorithms are existing apply algorithms that may be utilized by the target DBMS. Examples of parallel apply algorithms include Java™ Database Connectivity (JDBC) batch, fast apply, and external table bulk apply. Identifying a plurality of parallel apply algorithms may include identifying any apply algorithms that may have been used by the target DBMS. In order for the machine learning algorithm to select a parallel apply algorithm, the machine learning algorithm may need to have parallel apply algorithms to select from.

Method 100 includes operation 150 to obtain an optimal parallel apply algorithm. Once the characteristics of the data (i.e., the source workload data and the replication environment data) have been inputted into the machine learning algorithm, the machine learning algorithm may determine a "best fit" parallel apply algorithm, herein referred to as an optimal parallel apply algorithm. The optimal parallel apply algorithm may be a parallel apply algorithm, from the plurality of parallel apply algorithms, that is most likely to produce a parallel environment on the target DBMS with the current data characteristics. In some embodiments, if multiple parallel apply algorithms may produce a parallel environment with the current data characteristics, the optimal parallel apply algorithm may be the algorithm that most efficiently and accurately produces the parallel environment.

Method 100 includes operation 160 to apply the optimal parallel apply algorithm. Once the optimal parallel apply environment is obtained, it may be applied to the target DBMS. Applying the optimal parallel apply algorithm may include running the parallel apply algorithm on a processor of the target DBMS. For example, applying an external table bulk apply algorithm may include creating a list of reordered operations for a data table (e.g., in a RDBMS) and may applying the reordered operations using external tables and delete and insert statements. This may help tune the performance for the target DBMS.

Method 100 includes operation 170 to evaluate the performance of the optimal parallel apply algorithm. In some embodiments, as depicted in operation 170 of method 100, this includes determining whether parallelism in the target DBMS was achieved using the optimal parallel apply algorithm. For example, parallelism may be achieved when processing and sharing (for example, between DBMS s) of the data and applications is continuous and efficient. In another example, the optimal parallel apply algorithm may be partially successful when parallelism was achieved (for example, data and applications are successfully shared between DBMSs), but not very efficiently. For instance, the DBMS may have latency and/or throughput standards/limitations, and these limitations may have been exceeded using the optimal parallel apply algorithm, indicating that the algorithm was not efficient. In another example, parallelism may not have been achieved and the optimal parallel apply algorithm may not have been successful when processing is slow and/or inefficient and prevents (or at least significantly slows down) processing in other DBMSs that are reliant on the results of the current processing, therefore causing a bottleneck. In order to continuously train and improve the machine learning algorithm, the determined optimal parallel apply algorithm may be evaluated in order to determine whether it was effective, and, if effective, how effective. In some embodiments, evaluating the performance of the optimal parallel apply algorithm includes analyzing the parallelism of the target DBMS to determine whether parallelism was achieved.

If parallelism was not achieved, then it may be determined that the optimal parallel apply algorithm failed for these specific input variables and it is likely that the machine learning algorithm did not identify the correct optimal parallel apply algorithm. In some embodiments, if parallelism was not achieved, method 100 proceeds to operation 175 to select another parallel apply algorithm to run. In some embodiments, the machine learning algorithm is used to identify a next best parallel apply algorithm. If the optimal parallel apply algorithm did not work, the next best (e.g., best fit) algorithm may succeed in achieving parallelism.

If it is determined that parallelism was achieved (in operation 170), then it may be determined that the optimal parallel apply algorithm was at least partially successful for these specific input variables. In some embodiments, when parallelism is achieved in the target DBMS, analyzing the parallelism of the DBMS may further include analyzing the efficiency, accuracy, etc. of achieving the parallelism.

In some embodiments, evaluating the performance of the optimal parallel apply algorithm further includes determining, based on analyzing the parallelism, whether the optimal parallel apply algorithm is accurate or correct. If parallelism was not achieved, it is likely that the determined optimal parallel apply algorithm was not accurate. If parallelism was achieved, then the optimal parallel apply algorithm may have been accurate. In some instances, even if parallelism was achieved, it may not have been achieved particularly efficiently and/or accurately, which may result in a determination that the optimal parallel apply algorithm may not have been accurate.

In some embodiments, evaluating the performance of the optimal parallel apply algorithm includes determining whether there are any errors from the optimal parallel apply algorithm and determining whether there is any overfitting. Overfitting may occur when the machine learning model too closely fits the specific data points. In other words, the machine learning algorithm may have made an overly complex model to fit a specific data set. If the model was overfit, it may not be accurate and may not help determine an optimal parallel apply algorithm for any other set of data, because the data will be too different from the overfit model. Overfitting may be determined by analyzing the selection of the parallel apply algorithm (as the optimal parallel apply algorithm), compared to the other parallel apply algorithms. For instance, if one of the parallel apply algorithms is almost never selected as the optimal parallel apply algorithm, it may be determined that the minimally selected optimal parallel apply algorithm is overfit, because the model never (or almost never) fits any data sets.

In some embodiments, the machine learning algorithm is trained using the results of the evaluating the performance of the optimal parallel apply algorithm (depicted in operation 195 of FIG. 1).

Method 100 includes operation 190 to receive feedback, for instance on thread usage and response times. In some embodiments, as depicted in FIG. 1, once the parallelism of the target DBMS is evaluated (in operation 170), the target DBMS receives feedback about the optimal machine learning algorithm. In some embodiments, feedback is received independent from any evaluation of parallelism. Feedback may be gathered from users (for example, program developers) of the target DBMS. In some instances, the target DBMS requests feedback from the users through a user interface (UI). In some instances, a user is automatically prompted for feedback through the UI. The feedback may be used to train the machine learning algorithm.

Method 100 includes operation 195 to train the machine learning algorithm. In some embodiments, as depicted in FIG. 1, both the evaluation of the parallelism of the target DBMS and the received feedback are used to train the machine learning algorithm. In some embodiments, either the feedback or the parallelism evaluation are used to train the machine learning algorithm. Training the machine learning algorithm may include providing the algorithm with data (e.g., the parallelism evaluation and/or the feedback) and then the machine learning algorithm may analyze the data, finding patterns and mapping input data attributes to potential optimal parallel apply algorithms. Training the machine learning algorithm may increase the accuracy of correctly determining an optimal parallel apply algorithm for various data characteristics.

Figure 5:
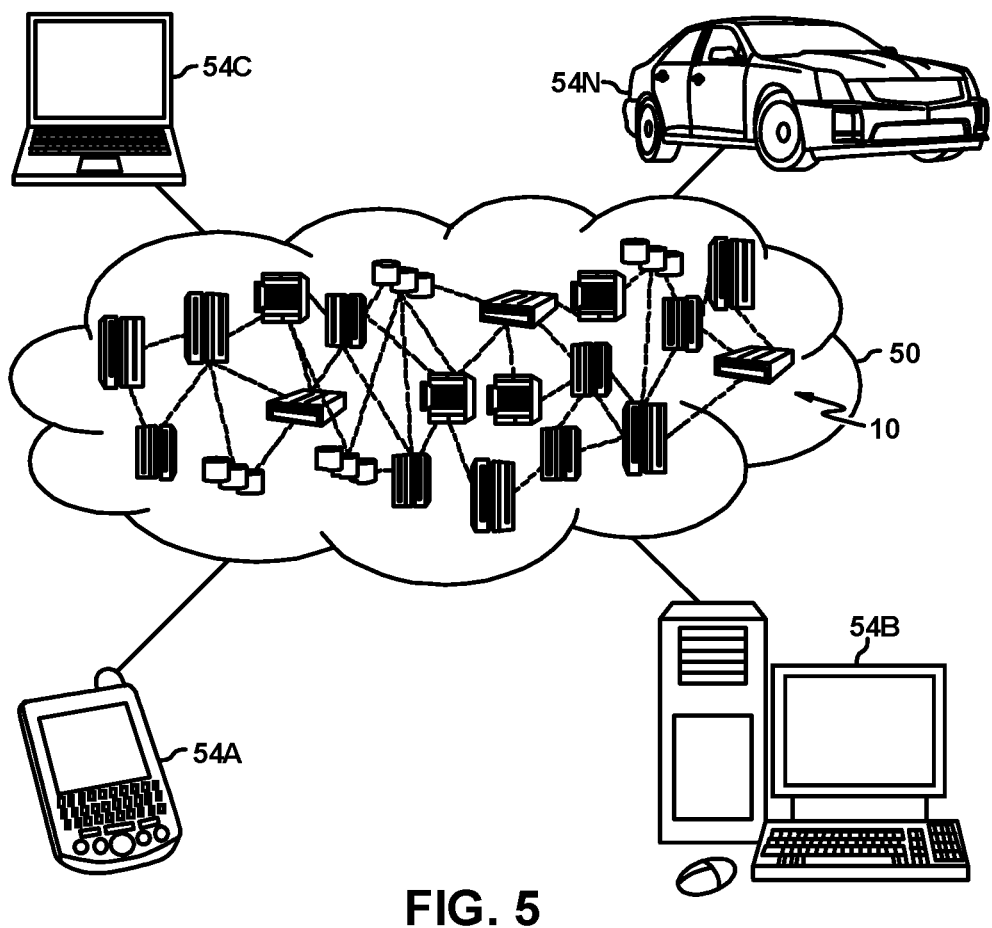
FIG. 5 depicts a cloud computing environment, according to some embodiments.

Referring to FIG. 2, a schematic diagram of a sample replicated database management system 200 is depicted, according to some embodiments. The sample replicated database management system 200 may include a source database management system (DBMS) 210 and a target DBMS 230. Although only one target DBMS is depicted, the replicated database management system 200 may have any number of target DBMS s. The source DBMS 210 and the target DBMS 230 may be connected via a network through the cloud 220. In some embodiments, cloud 220 corresponds with cloud computing environment 50 (FIG. 5). Although it is depicted that source DBMS 210 and target DBMS 230 are connected via cloud, in some instances, source DBMS 210 and target DBMS 230 may alternatively be connected through Internet of Things (IoT), a network, wireless internet, etc.

Source DBMS 210 includes a log 218, a source replication agent 212, a database 216, and a machine learning (ML) master engine 214. In some embodiments, the source replication agent 212 reads workload data, and in some instances replication environment data, from the log 218. The source replication agent 212 may also obtain workload data and/or environment data from database 216. In some embodiments, the source replication agent 212 transmits the workload data and the replication environment data to the target replication agent 232 on the target DBMS 230 through cloud network 220.

A ML engine, specifically the master engine 214, is on the source DBMS 210. This may be beneficial because the source DBMS 210 and target DBMS 230 are part of a replication environment. In some embodiments, certain data (for example, parallel apply algorithms) may be created on the ML master engine 214 and may be analyzed on the ML worker engine 234, discussed further herein. The data may be transmitted to the ML worker engine 234 through cloud network 220. In some embodiments, the source DBMS 210 may not have an ML engine (e.g., master engine 214) and ML worker engine 234 on the target DBMS 210 may be a master engine.

Target DBMS 230 includes a target replication agent 232, a ML worker engine 234, and a database 236. As the target replication agent 232 reads transactions received from the source replication agent 212, the input data required for the ML engines 214 and 234 may be captured for training the machine learning algorithm. Training sets may be created in real time based on various inputs (e.g., transaction size, table/row size, target apply/database latency, target table type, amount of in scope data, etc. The replication agent 232 may transmit the characteristics of the workload data and the replication environment data to the ML engine 234. The ML engine 234 may be a worker engine in relation to the ML master engine 214. The ML worker engine 234 may use the characteristics as input variables for the machine learning algorithm. The ML worker engine 234 may have the capabilities to run and train the machine learning algorithm. Once an optimal parallel apply technique is determined, it may be transmitted to the target replication agent 232. The target replication agent 232 may apply the optimal parallel apply technique. The target replication agent 232 may transmit the received data (received from the source replication agent 212) to the database 236.

In some embodiments, the DBMS s are relational database management systems (RDBMSs). A RDBMS is a database that stores data in structured formats (i.e., using rows and columns). By storing the data in a structured format, the values within each table are related to each other, and potentially other tables. Relational databases are able to run queries across multiple tables at once, due to the relational structure.

Figure 3:
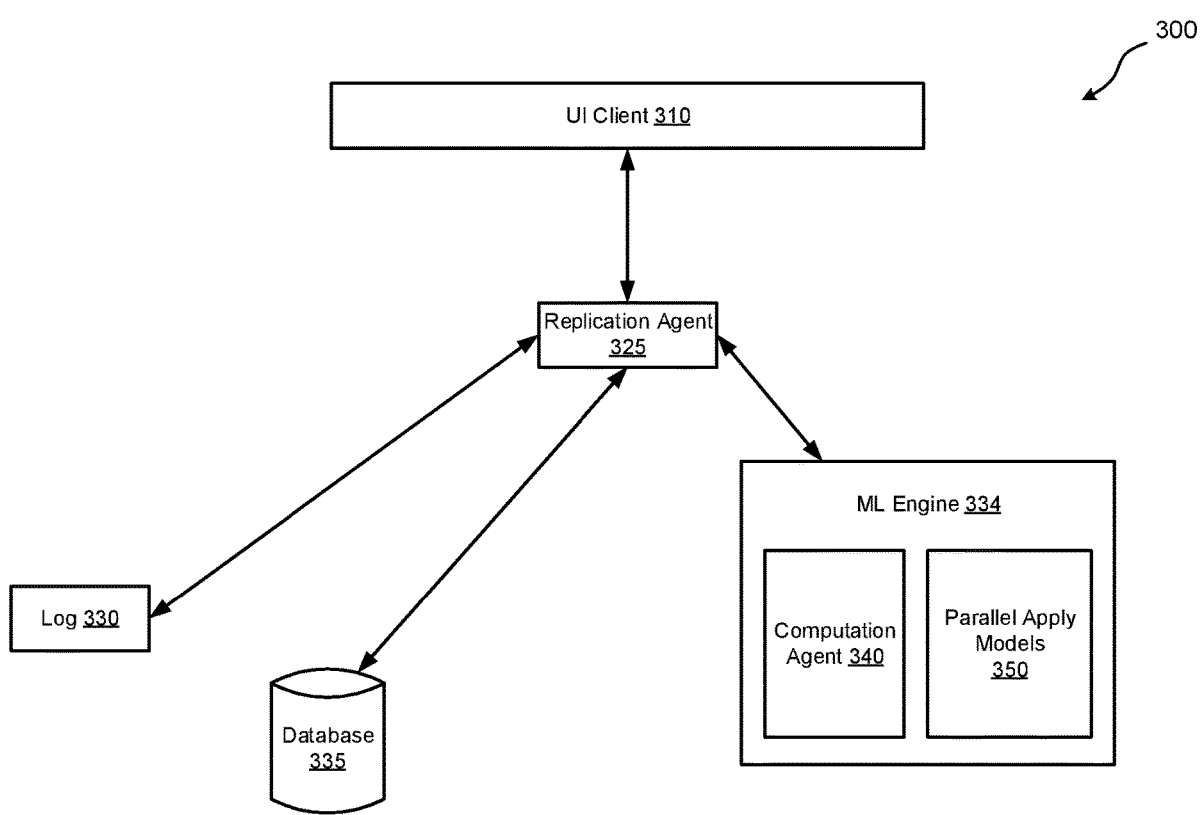
FIG. 3 depicts a schematic diagram of a target database management system environment, according to some embodiments.

Referring now to FIG. 3 a schematic diagram of a target database management system environment 300 is depicted, according to some embodiments. Target database management system environment 300 includes a user interface (UI) client 310, a replication agent 325, a log 330, a database 335, and a machine learning (ML) engine 334. In some embodiments, ML engine 334 includes a computation agent 340 and parallel apply models 350. In some embodiments, ML engine 334 corresponds with ML worker engine 234 (FIG. 2). In some embodiments, agent 325 corresponds with target replication agent 232, and database 335 corresponds with database 236 (FIG. 2). ML engine 334, replication agent 325, log 330, and database 335 may all be a part of a target DBMS (such as target DMBS 230 from FIG. 2).

In some embodiments, the replication agent 325 receives the workload data and the replication environment data from log 330 and database 335. In some embodiments, as discussed herein, log 330 and database 335 may be on a source DBMS and a replication agent on the source DBMS (e.g., source replication agent 212 (FIG. 2)) may transmit the data to replication agent 325. In some embodiments, this data is directly transmitted to the ML engine 334. The ML engine 334 may have a computation agent 340 and a parallel apply model agent 350. The parallel apply model agent 350 may keep track of all known parallel apply algorithms. The computation agent 340 may do all calculations/computations using the ML algorithm. In some embodiments, as discussed herein, once the computation agent 340 and the ML engine 334 determine an optimal parallel apply algorithm. The optimal parallel apply algorithm may be communicated to the replication agent 325, and the replication agent may run the optimal parallel apply algorithm on the target DBMS. In some embodiments, the replication agent 325 communicates with UI client 310 in order to obtain feedback about the optimal parallel apply algorithm. In some embodiments, the replication agent 325 transmits instructions for the UI client 310 to display a prompt for a user to give feedback on the algorithm. In some embodiments, the UI client 310 automatically displays a prompt for the user.

Referring to FIG. 4, computer system 400 is a computer system/server 402 is shown in the form of a general-purpose computing device, according to some embodiments. In some embodiments, computer system/server 402 is located on the linking device. In some embodiments, computer system 402 is connected to the linking device. The components of computer system/server 402 may include, but are not limited to, one or more processors or processing units 410, a system memory 460, and a bus 415 that couples various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random-access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the disclosure.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
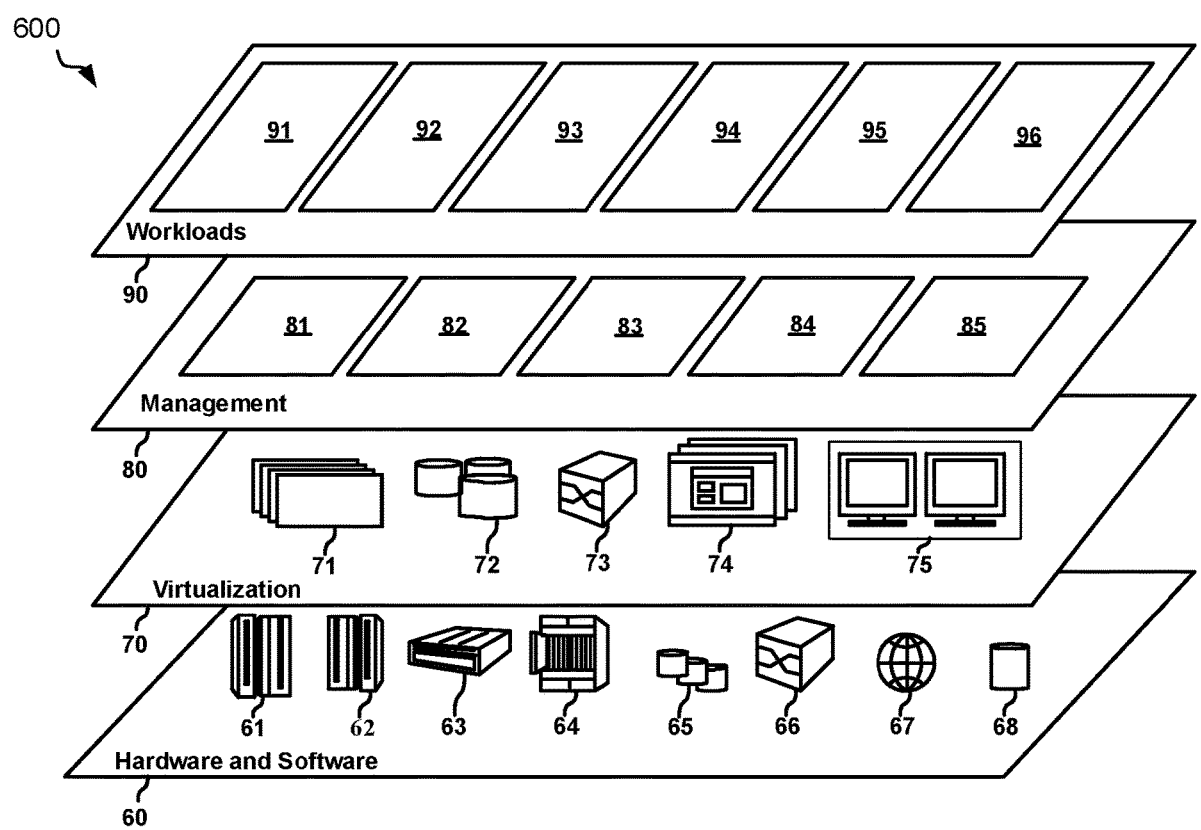
FIG. 6 depicts abstraction model layers, according to some embodiments.

Referring now to FIG. 6, a set of functional abstraction layers 600 provided by cloud computing environment 50 (FIG. 5) is shown, according to some embodiments. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parallel apply mechanism analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving source workload data and replication environment data, wherein the source workload data comprises at least a stream of changes to a target database management system;
analyzing characteristics of the source workload data and the replication environment data;
inputting, as input variables, the characteristics of the source workload data and the replication environment data into a machine learning algorithm;
identifying a plurality of parallel apply algorithms;
obtaining, from the machine learning algorithm, an optimal parallel apply algorithm from the plurality of parallel apply algorithms; and
applying the optimal parallel apply algorithm to the target database management system.

2. The method of claim 1, further comprising:
receiving, in response to applying the optimal parallel apply algorithm, feedback of thread usage and response times due to the optimal parallel apply algorithm; and
training the machine learning algorithm using the feedback of the thread usage and the response times.

3. The method of claim 1, further comprising:
evaluating, in response to applying the optimal parallel apply algorithm, a performance of the optimal parallel apply algorithm.

4. The method of claim 3, wherein evaluating the performance of the optimal parallel apply algorithm comprises:
analyzing parallelism of the target database management system;
determining, based on the analyzing, whether the optimal parallel apply algorithm is accurate;
determining whether there are any errors from the optimal parallel apply algorithm; and
determining whether there is any overfitting.

5. The method of claim 3, further comprising:
training the machine learning algorithm using results of the evaluating the performance of the optimal parallel apply algorithm.

6. The method of claim 1, wherein analyzing characteristics of the source workload data and the replication environment data comprises:
identifying data patterns in the source workload data and the replication environment data.

7. The method of claim 6, wherein the data patterns comprise at least one of daily batch cycles and application patterns.

8. The method of claim 1, wherein the source workload data comprises subscription and table mappings information of source workloads.

9. The method of claim 1, wherein the characteristics of the source workload data comprise at least one of transaction size, table size, row size, key distribution patterns, unique update sequences, and unkeyed data patterns.

10. The method of claim 1, wherein the characteristics of the replication environment data comprise at least one of system resource capacity and target database performance.

11. The method of claim 1, wherein the plurality of parallel apply algorithms comprise at least one of JDBC batch, fast apply, and external table bulk apply.

12. A system having one or more computer processors, the system configured to:
receive source workload data and replication environment data, wherein the source workload data comprises at least a stream of changes to a target database management system;
analyze characteristics of the source workload data and the replication environment data;
input, as input variables, the characteristics of the source workload data and the replication environment data into a machine learning algorithm;
identify a plurality of parallel apply algorithms;
obtain, from the machine learning algorithm, an optimal parallel apply algorithm from the plurality of parallel apply algorithms; and
apply the optimal parallel apply algorithm to the target database management system.

13. The system of claim 12, further configured to:
receive, in response to applying the optimal parallel apply algorithm, feedback of thread usage and response times due to the optimal parallel apply algorithm; and
train the machine learning algorithm using the feedback of the thread usage and the response times.

14. The system of claim 12, further configured to:
evaluate, in response to applying the optimal parallel apply algorithm, a performance of the optimal parallel apply algorithm.

15. The system of claim 14, wherein evaluating the performance of the optimal parallel apply algorithm comprises:
analyzing parallelism of the target database management system;
determining, based on the analyzing, whether the optimal parallel apply algorithm is accurate;
determining whether there are any errors from the optimal parallel apply algorithm; and
determining whether there is any overfitting.

16. The system of claim 14, further configured to:
train the machine learning algorithm using results of the evaluating the performance of the optimal parallel apply algorithm.

17. A computer program product comprising a computer readable storage medium having program instructions embodied therewith, the program instructions executable by a server to cause the server to perform a method, the method comprising:
receiving source workload data and replication environment data, wherein the source workload data comprises at least a stream of changes to a target database management system;
analyzing characteristics of the source workload data and the replication environment data;
inputting, as input variables, the characteristics of the source workload data and the replication environment data into a machine learning algorithm;
identifying a plurality of parallel apply algorithms;
obtaining, from the machine learning algorithm, an optimal parallel apply algorithm from the plurality of parallel apply algorithms; and
applying the optimal parallel apply algorithm to the target database management system.

18. The computer program product of claim 17, wherein the method further comprises:
- receiving, in response to applying the optimal parallel apply algorithm, feedback of thread usage and response times due to the optimal parallel apply algorithm; and
- training the machine learning algorithm using the feedback of the thread usage and the response times.

19. The computer program product of claim 17, wherein the method further comprises:
- evaluating, in response to applying the optimal parallel apply algorithm, a performance of the optimal parallel apply algorithm.

20. The computer program product of claim 19, wherein evaluating the performance of the optimal parallel apply algorithm comprises:
- analyzing parallelism of the target database management system;
- determining, based on the analyzing, whether the optimal parallel apply algorithm is accurate;
- determining whether there are any errors from the optimal parallel apply algorithm; and
- determining whether there is any overfitting.

* * * * *